H. H. BEACH.
Grain Winnower.
No. 19,615.
Patented March 16, 1858.
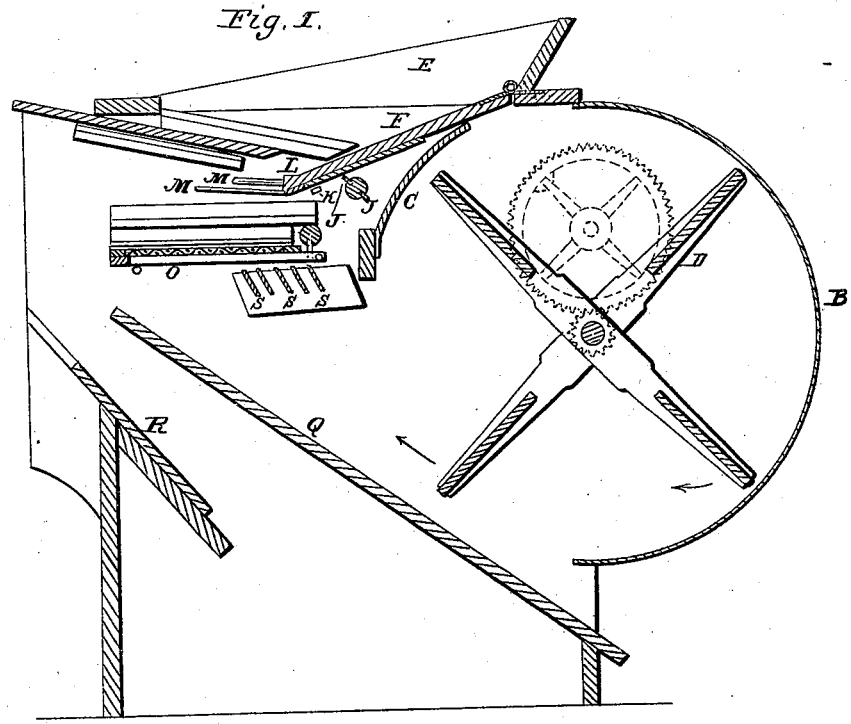
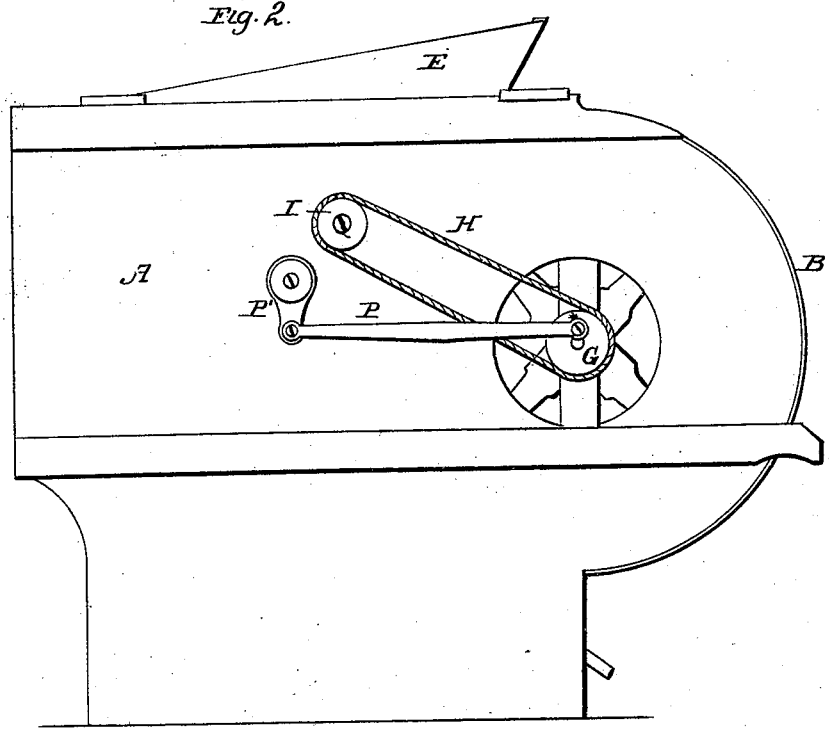

UNITED STATES PATENT OFFICE.

HENRY H. BEACH, OF PHILADELPHIA, PENNSYLVANIA.

GRAIN-WINNOWER.

Specification of Letters Patent No. 19,615, dated March 16, 1858.

*To all whom it may concern:*

Be it known that I, HENRY H. BEACH, of the city and county of Philadelphia and State of Pennsylvania, have invented certain new and useful Improvements in Grain-Winnowers; and I do hereby declare that the following is a full and exact description of the construction and operation of the same, reference being made to the accompanying drawings and to the letters of reference marked thereon, in which—

Figure 1 is a longitudinal and vertical section through the center of the width of the machine, and Fig. 2 is a side elevation.

The nature of my invention consists in hinging the bottom delivery board of the hopper at its upper end and giving to it a vibratory motion at its lower end, by which the feed of grain or seed to the action of the blast from the fan is rendered more uniform than when the feed is effected in the ordinary manner; also in giving to the blast from the fan a direction beneath and through the shaking riddle and beneath and through the grain or seed placed thereon, whereby the impurities are separated from the grain or seeds with greater facility than when the direction of the blast is in line with the length of the riddle and over the surface of the grain or seeds.

A is the body or case of the machine, made of the materials and form ordinarily employed for the purpose.

B is the covering to the fan, inclosing it a little more than half its circumference, and projecting at the bottom into the case A a sufficient distance to give to the blast from the fan its proper direction. The bottom delivery board of the hopper is used to form a portion of the top covering of the fan and the partition C to form the remainder— an opening of proper size for the delivery of the blast being left between the terminus of the bottom part of the cover B and the bottom edge of the partition C.

D is the fan, constructed and operated in the usual manner.

E is the hopper, elevated above the top of the case A at its rear end, to increase its capacity at that point.

F is the bottom delivery board of the hopper, hinged at its upper end to the case A, and having a shaking or vibratory motion given to its lower end for the purpose of separating the chaff from the grain or seeds and insuring a more uniform feed of grain or seed to the action of the fan blast. The vibratory motion is given by the pulley G on the fan shaft, the belt H and the pulley I and the shakers J, J'. The shakers are made of such form as to lift the board F and drop it with a sudden motion—the board rising to the height of the shakers, and being received and held up by the stop K when the shakers leave it.

L is a strip placed upon the bottom edge of the board F to form a horizontal landing to retard the descent of the grain from that board.

M, M' are two series of wire fingers attached to the bottom edge of the board F, placed near enough to each other to allow the grain to pass them, but so as to catch the chaff in its descent from that board; the chaff being mostly blown from the fingers without entering the riddle with the grain.

N is the back bottom board of the hopper—made to slide up and down in the direction of its length to increase or diminish the size of the aperture through which the grain, &c. pass to the action of the blast.

O is the shoe containing the riddle to sift and separate the grain or seed from the chaff and other impurities which may pass into the riddle. The shoe receives a shaking motion in the direction of its length, instead of in the direction of its width in the usual manner. The former tends to shake the chaff to the outer and open end of the shoe, while the latter tends to gather it in the center of the riddle. This motion is given to it by a pin placed on the pulley G through the connecting rod P and crank P'.

Q is a platform upon which the grain from the riddle is received and which carries the grain to the rear end of the machine. The impurities, chaff, &c., which are not blown off by the blast from the fan, are delivered from the end of the riddle upon the platform R and carried under the machine.

S, S', S'' S''' S'''' are a series of inclined planes to intercept the blast from the fan and direct it beneath and through the riddle at the requisite angle to carry off the chaff from the fingers M, M', and the chaff and lighter impurities which may fall into the riddle at the mouth of the machine.

The operation of the machine is as follows. The fan being revolved in the direction of the darts, a rapid vibratory motion is communicated to the board F in a vertical direction, and to the shoe O in a horizontal one, through the attachments and connections described. The grain being deposited in the hopper E it falls both by its gravity and by the motion given to the board F, toward the aperture at the bottom end of that board. The grain, being heavier than the chaff and lighter impurities, falls to the bottom and leaves those articles on top—the grain falling into the riddle while the chaff is caught by the fingers M, M', and together with the lighter impurities is carried off to the mouth of the machine by the action of the blast from the fan upon them—the blast being deflected and carried in proper direction beneath and through the riddle by the inclined planes S, S', &c. The strongest action of the blast—from the position of the opening of the drum and the location of the planes S, &c. is at the front end of the shoe in the direction of the fingers M, M' where it is most required. The grain is riddled through the riddle and falls upon the platform Q, and is delivered at the rear end of the machine, while the chaff and impurities that may fall into the riddle and which are not carried off from it by the action of the blast upon them are blown off, when they are dropped from the front end of the riddle, while the heavier impurities—stones, &c.—which are unaffected by the blast are dropped from the front end of the riddle upon the platform R and are carried under the machine.

Having thus described the construction and operation of the machine what I claim as my invention and desire to secure by Letters Patent is—

1. The bottom delivery board F, having one or more series of fingers at its lower end, when the same is vibrated in a vertical direction the blast of air from the fan acting upon the fingers in the manner herein described and for the purposes set forth.

2. The combination of the series of inclined planes S, S' with the shoe O, and fingers M, M', when arranged in relation to each other and to the cover B and partition C, as herein described, for the purpose of deflecting the blast of air from the fan and directing it through the riddle and through the fingers as herein set forth.

HENRY H. BEACH.

Witnesses:
WM. A. BUTCHER,
FRANCIS S. LOW.